Feb. 11, 1947.　　　H. A. JOSEPHSON　　　2,415,744
ATTACHMENT FOR TRACTORS
Filed Jan. 8, 1945
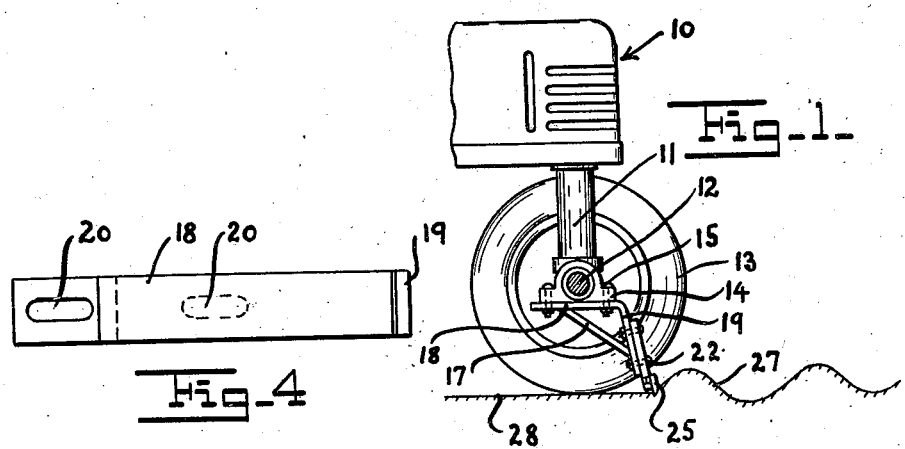
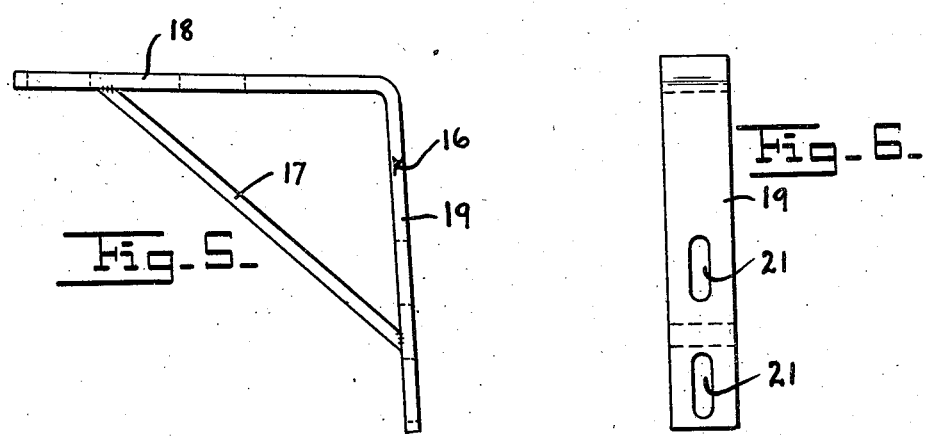
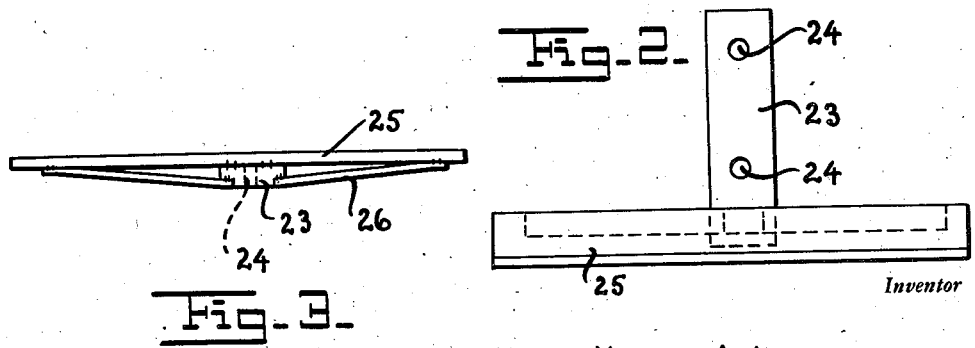
Inventor
HAROLD A. JOSEPHSON
By *Clarence A. O'Brien and Harvey B. Jacobson*
Attorneys Patented Feb. 11, 1947

2,415,744

UNITED STATES PATENT OFFICE 2,415,744

ATTACHMENT FOR TRACTORS

Harold A. Josephson, Princeton, Ill.

Application January 8, 1945, Serial No. 571,871

1 Claim. (Cl. 37—180)

This invention relates to an attachment for tractors, and more particularly to such an attachment adapted to level the soil in front of the tractor.

A primary object of this invention is the provision of an attachment for tractors adapted to be positioned in front of the rubber tired front wheels thereof, to level the soil in cross cultivation.

As conducive to a clearer understanding of this invention it may here be pointed out that when cultivating corn or other crops planted in rows and cultivated, the cultivator is usually set to throw the soil toward the plant rows, leaving a depression or ditch between the rows. When the field is cross cultivated, it is necessary to drive the tractor across these ditches and ridges. In utilizing a wheeled type tractor, the rubber tired front wheels of the tractor will bounce over these ridges, making the tractor hard to ride and hard to steer.

An important object of this invention is the provision of an attachment for tractors adapted to be bolted in the center of the front axle or the like, provided with a blade that will ride in front of the front wheels and level the soil off the ridge of the row, carrying it forward to the ditch between the rows, to provide a smooth path for the front tractor wheels to travel on, thus reducing the bouncing of the tractor and rendering cross cultivation easier and more effective.

Other objects reside in the combinations of elements, arrangements of parts, and features of construction, all as will be more fully pointed out hereinafter and shown in the accompanying drawing, wherein:

Figure 1 is a side view partially in elevation and partially in section showing the device of the instant invention attached to the front axle of a tractor or the like.

Figure 2 is a front plan view of the device in Figure 1, certain parts thereof being indicated in dotted lines.

Figure 3 is a bottom view of the blade assembly.

Figure 4 is a bottom plan view of a constructional detail.

Figure 5 is a side elevational view of still another constructional detail, and

Figure 6 is an elevational view of a still further element of construction.

Like reference numerals refer to like parts throughout the several views of the drawing.

Having reference now to the drawing, there is generally indicated at 10 a fragment of a tractor, provided with a steering post 11, a front axle 12 and front wheels 13. The device of the instant invention is adapted to be attached to the front axle 12 between the wheels as by means of a clamping bracket 14 having apertures therethrough, and being provided with bolts 15 adapted to secure a right angled bracket 16 having an angularly disposed brace 17, to the tractor. The bracket 16 is comprised of a horizontal leg 18 and a vertical leg 19. The leg 18 is provided as best shown in Figure 4 with two elongated slots 20, through which the bolts 15 are adapted to pass, in order to permit a relative longitudinal adjustment of the device if so desired, while the leg 19 is similarly provided with a pair of elongated slots 21 through which are adapted to be passed suitable bolts 22 adapted to hold adjustably thereon lug 23 having apertures 24 therein to the lower extremity of which is secured a scraper blade 25 provided with reinforcing strips 26 to the rear of the same.

Now from the foregoing it will be seen that when the blade 25 it attached to the axle 12 of the tractor in the manner previously described, the same may be readily adjusted to any desired height within the limits of the apparatus and positioned at a desirable longitudinal location with respect to the axle, by virtue of the slots 20 and 21 and that as the tractor moves forward in cross cultivation, the scraper blade 25, as shown in Figure 1, levels the ridges 27 to form a smooth relatively level surface 28 over which the tractor may pass with a minimum of jolting and difficulty.

Now from the foregoing it will be seen that there is herein provided a device accomplishing all the objects of this invention and others including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

An attachment for tractors comprised of a unitary L-shaped bracket having a horizontal leg, a vertical leg, and an angularly disposed reinforcing member extending between said legs, means for adjustably attaching said horizontal leg to the front axle of a tractor, said means including bolts engageable in elongated slots of said horizontal leg, a scraper blade secured to said vertical leg, said vertical leg having elongated slots therein, said scraper blade having an extending lug secured thereto, and diagonally disposed reinforcing members extending from said leg to the extremities of said blade and bolts passed through apertures in said lug and said last-mentioned elongated slots to hold said blade and said vertical leg in related assembly.

HAROLD A. JOSEPHSON.

REFERENCES CITED

The following references are of record in the file of this patent:

UNITED STATES PATENTS

| Number | Name | Date |
|---|---|---|
| 2,096,656 | Stoulil | Oct. 19, 1937 |
| 2,099,637 | Wendel | Nov. 16, 1937 |
| 249,104 | Schiller | Nov. 1, 1881 |
| 266,692 | Held | Oct. 31, 1882 |
| 283,298 | Stephenson | Aug. 14, 1883 |